UNITED STATES PATENT OFFICE.

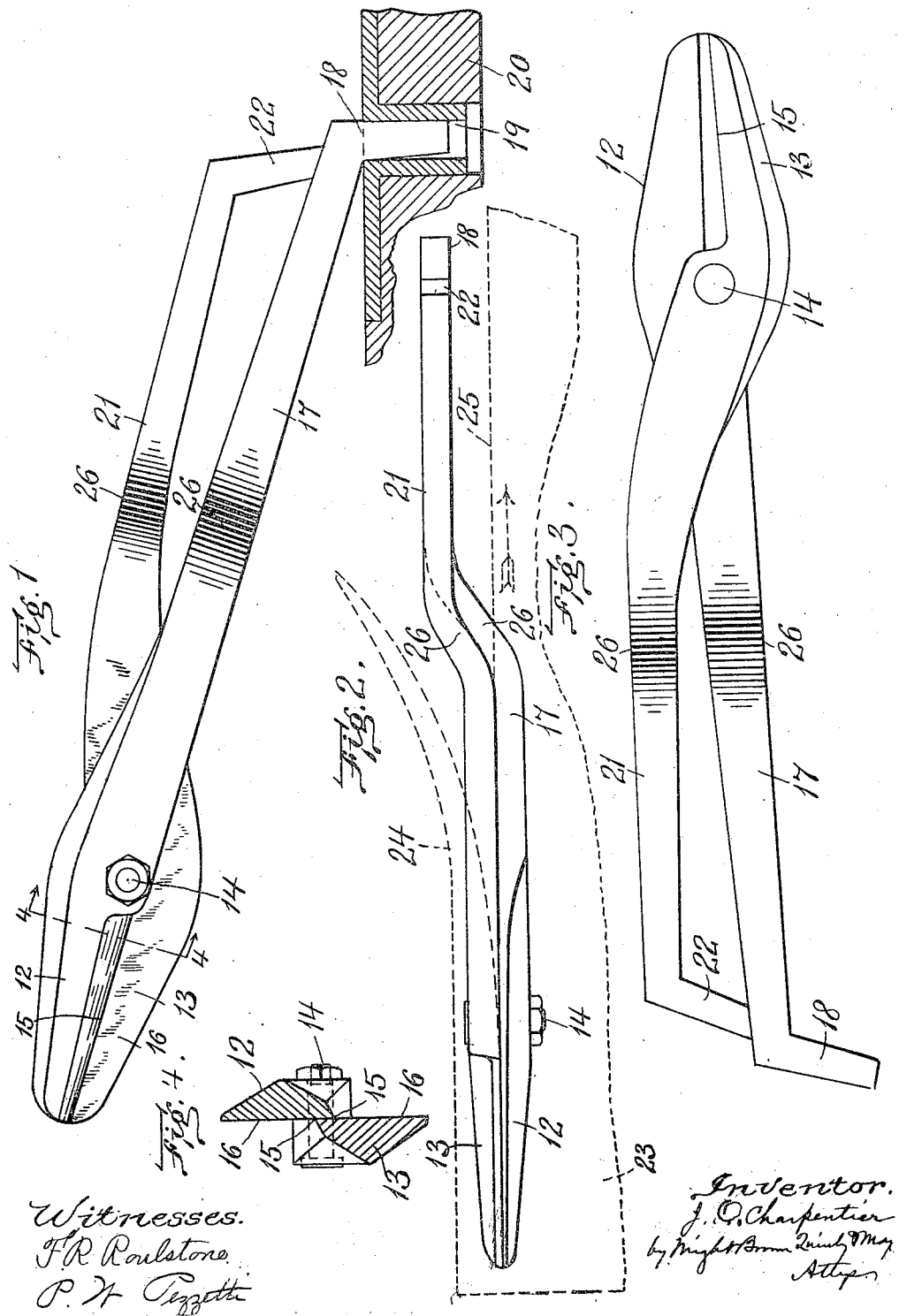

JOSEPH O. CHARPENTIER, OF CONCORD, NEW HAMPSHIRE.

METAL-CUTTING SHEARS.

938,122.

Specification of Letters Patent.

Patented Oct. 26, 1909.

Application filed April 23, 1909. Serial No. 491,790.

*To all whom it may concern:*

Be it known that I, JOSEPH O. CHARPENTIER, of Concord, in the county of Merrimack and State of New Hampshire, have invented certain new and useful Improvements in Metal-Cutting Shears, of which the following is a specification.

This invention relates to shears employed by tinsmiths for cutting sheet metal, the shear blades which are pivotally connected and adapted to operate in the usual manner, being provided with shanks, one of which is provided with a tang adapted to be inserted in a socket in a work bench and support the shears in the desired position above the bench, the other shank constituting an operating handle which is moved by the operator to cause the cutting action of the shear blades.

The invention has for its object to provide shears of this character in which the tang on the supporting shank is so located that it will not obstruct the sheet metal body which is being formed by the shears when an elongated practically straight edge is being cut, so that as the cutting action progresses, the sheet metal body passes rearwardly in a direction parallel with the shanks.

The invention consists in the improvements which I will now proceed to describe and claim.

Of the accompanying drawings, forming a part of this specification,—Figure 1 represents a side elevation of a pair of metal-cutting shears embodying my invention, and a sectional view of a portion of the supporting bench and its tang-receiving socket. Fig. 2 represents an edge view of the shears. Fig. 3 represents a view of the opposite side of the shears from that shown in Fig. 1. Fig. 4 represents a section on line 4—4 of Fig. 1.

The same reference characters indicate the same parts in all the figures.

In the drawings,—12 and 13 represent metal cutting shear blades of a well-known form, the blades being connected by a pivot 14, and each having a cutting edge 15. The flat sides 16 of the blades are in rubbing contact with each other, as is usual in shears of this character. The upper blade 12 is provided with a shank 17, the outer end of which is provided with a tang 18 adapted to enter a socket 19 in a work bench 20, the arrangement of the tang being such that when it is inserted in the socket, the shears are supported above the top of the bench in the position shown in Fig. 1. The lower blade 16 is provided with a shank 21 having a tang 22 at its outer end adapted to bear upon the shank 17 when the blades are closed upon each other, thus limiting the closing movement of the blades and preventing contact of the hand of the operator grasping the shank 21 with the lower shank 17.

In Fig. 2, I have shown by dotted lines a portion of a sheet metal body 23 from which a chip or waste portion 24 is being severed by the shears, 25 representing the freshly cut edge of the body 23, which is supposed to be passing in the direction indicated by the dotted arrow.

In carrying out my invention, I bend the shanks 17 and 21 laterally, as shown at 26, in such manner as to offset the outer ends of the shanks and the tangs 18 and 22 formed thereon, from the line of the cutting edges of the blades and of the freshly cut edge 25, so that when an elongated practically straight edge is being formed, it is adapted to pass rearwardly along the surface of the bench beside the tang 18 without coming in contact with or being obstructed by said tang. The operator is therefore enabled to cut and form a sheet metal body of any desired size without being obliged to deflect the portion of the cut edge passing rearwardly from the blades in order to enable it to pass by the fixed tang 18.

Heretofore in shears of this character, the shanks have extended practically in alinement with the line of cut, so that the fixed tang 18 is located in such position that it will stand in the path of the freshly cut edge 25 passing rearwardly from the blades, thus necessitating considerable effort and care on the part of the workman in holding the work out of contact with the fixed tang. My improvement above described obviates this necessity and greatly enhances the convenience of the workman.

I claim:

Metal-cutting shears comprising coöperating shear blades having shanks one of which has a tang to bear on the upper edge of the other shank, said other shank having a tang at its outer end adapted to enter a bench socket, the rear portions of both of said shanks being offset so that the supporting tang stands at one side of the line of the cut and is prevented from obstructing a piece of work passing backwardly from the blades, the other tang being caused by the offset of its shank to operate in a plane to limit the closing movement of the blades.

In testimony whereof I have affixed my signature, in presence of two witnesses.

JOSEPH O. CHARPENTIER.

Witnesses:
NATHL. E. MARTIN,
ALICE W. HAYLEY.